United States Patent
Chalfant, III et al.

(10) Patent No.: US 7,612,329 B2
(45) Date of Patent: Nov. 3, 2009

(54) APPARATUS AND METHOD FOR FREE SPACE OPTICAL COMMUNICATIONS BEAM STEERING WITHOUT GIMBALS

(75) Inventors: Charles H. Chalfant, III, Fayetteville, AR (US); Fred J. Orlando, West Melbourne, FL (US); Jeffrey T. Gregory, Mountainburg, AR (US); Chad B. O'Neal, Ruston, LA (US)

(73) Assignee: Space Photonics, Inc., Fayetteville, AR (US)

( * ) Notice: Subject to any disclaimer, the term of this patent is extended or adjusted under 35 U.S.C. 154(b) by 0 days.

(21) Appl. No.: 11/224,745

(22) Filed: Sep. 12, 2005

(65) Prior Publication Data

US 2006/0182448 A1 Aug. 17, 2006

Related U.S. Application Data

(60) Provisional application No. 60/609,420, filed on Sep. 13, 2004, provisional application No. 60/609,413, filed on Sep. 13, 2004.

(51) Int. Cl.
*H01J 3/14* (2006.01)
*H04B 10/00* (2006.01)
(52) U.S. Cl. .................................. 250/234; 398/131
(58) Field of Classification Search ... 250/203.1–203.6, 250/227.11, 234; 398/130, 131, 156; 385/16, 385/41
See application file for complete search history.

(56) References Cited

U.S. PATENT DOCUMENTS

| | | | |
|---|---|---|---|
| 5,062,150 A * | 10/1991 | Swanson et al. | 398/129 |
| 5,218,467 A | 6/1993 | Ross et al. | |
| 6,137,103 A * | 10/2000 | Giles et al. | 250/216 |
| 6,215,118 B1 * | 4/2001 | Heffner et al. | 250/227.11 |
| 6,285,481 B1 | 9/2001 | Palmer | |
| 6,327,063 B1 | 12/2001 | Rockwell | |
| 6,347,001 B1 | 2/2002 | Arnold et al. | |

(Continued)

FOREIGN PATENT DOCUMENTS

EP 0482472 A2 10/1991

(Continued)

OTHER PUBLICATIONS

U.S. Appl. No. 11/224,628, filed Sep. 12, 2005, Beam Steering for Optical Target Identification and Tracking without Gimbals or Scanning Mirrors.

(Continued)

*Primary Examiner*—Thanh X Luu
(74) *Attorney, Agent, or Firm*—J. Charles Dougherty

(57) ABSTRACT

A beam steering apparatus and method for free space optical transceivers is disclosed. The beam steering function is performed internally by way of translating an internal optical fiber in the focal plane of the transceiver telescope using miniature micro-electro-mechanical systems (MEMS). The optical design of the transceiver provides a wide field of view and a pointing and tracking field of regard that is directly proportional to the translation of the optical fiber in the focal plane of the telescope. The apparatus and method can eliminate the need for external gimballing systems, and replace the gimballed free space optical beam steering function with MEMS that consumes very little power.

13 Claims, 7 Drawing Sheets

U.S. PATENT DOCUMENTS

| | | |
|---|---|---|
| 6,556,324 B1 | 4/2003 | Meier |
| 6,577,421 B1 | 6/2003 | Cheng et al. |
| 6,731,878 B1 | 5/2004 | Britz et al. |
| 6,738,539 B2 * | 5/2004 | Hagood et al. ............... 385/16 |
| 6,935,042 B2 * | 8/2005 | Bonham et al. ............... 33/645 |
| 7,082,232 B2 * | 7/2006 | Bona et al. ................... 385/17 |
| 2003/0202236 A1 | 10/2003 | Khoshnevisan et al. |

FOREIGN PATENT DOCUMENTS

| | | |
|---|---|---|
| EP | 0482472 B1 | 10/1991 |
| EP | 0504022 A1 | 3/1992 |

OTHER PUBLICATIONS

U.S. Appl. No. 11/224,473, filed Sep. 12, 2005, MEMS-Based Optical Communications Beam Steering Apparatus.

* cited by examiner

APPARATUS AND METHOD FOR FREE SPACE OPTICAL COMMUNICATIONS BEAM STEERING WITHOUT GIMBALS

CROSS-REFERENCE TO RELATED APPLICATIONS

This application claims the benefit of U.S. provisional patent application No. 60/609,420, entitled "MEMS-Based Optical Communications Beam Steering Apparatus" and filed on Sep. 13, 2004, and U.S. provisional patent application No. 60/609,413, entitled "Apparatus and Method for Free Space Optical Communications Beam Steering without Gimbals" and also filed on Sep. 13, 2004. The entire disclosures of these applications are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract no. F29601-02-C-0021 awarded by the United States Air Force Research Laboratory.

BACKGROUND OF THE INVENTION

The present invention relates to the field of optical communications, and in particular to the field of beam steering for free space optical transceivers. More particularly, the present invention relates to a beam pointing and tracking apparatus and method carried out internally within the respective telescopes of a transmitter and receiver, without the use of external gimbals.

Laser communications systems are today employed in a vast array of applications, including without limitation communication with aircraft and satellites from ground positions. A laser communication system generally consists of a transmitting terminal and a receiving terminal. A transmitting terminal typically receives an electrical signal from a signal source, and converts the electrical signal into an optical signal. The transmitting terminal then transmits the resulting optical signal using a transmitting telescope. The receiving terminal receives the optical signal through a receiving telescope, which focuses the optical signal into an optical photodetector, and then converts the optical signal back into an electrical signal.

In order for a receiving terminal to receive an optical signal from a transmitting terminal, the terminal telescopes must be properly aligned. This alignment process is known as beam steering. Generally, beam steering may be defined as changing the direction of the main lobe of a radiation pattern. In optical systems, beam steering is the manipulation of a transmitting telescope or receiving telescope to point in a desired direction. Other applications for beam steering, in addition to optical communications, include laser illumination, laser designation, laser radar, pointing and tracking, and remote optical sensing.

Beam steering in optical systems may be accomplished by changing the refractive index of the medium through which the beam is transmitted, or by the use of mirrors or lenses. In particular, some existing non-gimballed beam-steering solutions include acousto-optics, liquid crystals, electro-optics, micro-optics, galvanometer or magnetic mirrors, and micro-mirror arrays. These types of systems, however, have generally proven to be unwieldy, or lack the speed, precision, and reliability necessary for high-speed, long-distance free-space optical communications. Thus the most common means for beam steering in optical communications systems is by the use of a motorized gimballing system. A gimbal is a mechanical apparatus to allow a suspended object to rotate freely along two simultaneous axes, within a defined angle of view. Gimbals are well known in the art, having been used, for example, since at least as early as the sixteenth century in the suspension of maritime compasses. A gimballing system used for the alignment of an optical transmitter or receiver typically moves the entire transmitting or receiving telescope through the required field of view. Often, the transmitter and receiver telescopes are mechanically coupled so that the transmitted beam is in the exact direction of an incoming optical beam for collection by the receiving telescope, the two telescopes thereby operating with a common gimballing system.

Accurate alignment of the transceiver system is essential for free space laser communications systems. Therefore, gimballing systems must provide accurate alignment angular resolution in order for the receiver telescope to efficiently collect the incoming optical beam. Conversely, the transmitter telescope must be able to accurately point its beam so that a remote-receiving terminal can efficiently collect the optical signal for the photodetector. Mechanical gimballing systems have been favored in many free-space optical communications systems because they can provide very fast alignment times coupled with high angular resolution.

Gimballed beam-steering systems do, however, suffer from several important disadvantages. Such systems are quite heavy due to the weight of the mechanical components, motors, and servos necessary for such a system. While weight may not be as important a factor in the design of a land-based system, weight is of paramount importance in aircraft and satellite design. Gimballing systems are also quite bulky due to the required mechanical components, which is also a significant disadvantage in the design of airborne and spaceborne systems. Finally, mechanical gimballing systems require the use of a great deal of electrical power, far more power than is typically consumed by the electronics associated with an optical receiver or transmitter system. Again, while power consumption may not be as important a factor in permanent ground-based systems, it is a critically important factor in airborne and spaceborne systems, as well as in mobile ground-based systems such as may be mounted on land vehicles.

What is desired then is a beam pointing and tracking system that provides high speed and high angular resolution, with reduced size, weight, and power consumption as compared to traditional gimballing systems now employed in laser communications terminals.

BRIEF SUMMARY OF THE INVENTION

The present invention is directed to an optical beam pointing and tracking apparatus and method that provides angular adjustment by means of the movement of an optical fiber residing in the focal plane of the transmitting or receiving telescope. Specifically, the invention comprises a micro-electro-mechanical system (MEMS) translation device residing in the focal plane of the transmitter or receiver telescope. The system accurately and rapidly moves the fiber, thereby providing, in an optical communications system, a corresponding pointing angle change in the output beam, and a corresponding relative angle change in the receiving telescope with regard to the incoming beam angle.

The present invention achieves very fast response times while carrying out angular pointing and tracking. Because the present invention requires only the movement of an optical fiber, it requires the consumption of far less power than the mechanical systems that rely upon gimbals. It also allows a transmitter or receiver system to be constructed that is of much smaller size and weight compared to comparable gimballed systems. Because the complex mechanical components of gimballing systems are not required, the overall cost of the transmitter or receiver system is significantly reduced.

It is therefore an object of the present invention to provide for an optical beam steering apparatus and method that achieves high speed and angular precision without the use of gimbals.

It is a further object of the present invention to provide for an optical beam steering apparatus and method that consumes relatively little electrical power during operation.

It is also an object of the present invention is to provide for an optical beam steering apparatus and method that is of a relatively small size and weight.

It is also an object of the present invention is to provide for an optical beam steering apparatus and method that has a relatively low production cost.

These and other features, objects and advantages of the present invention will become better understood from a consideration of the following detailed description of the preferred embodiments and appended claims, in conjunction with the drawings as described following:

DETAILED DESCRIPTION OF THE INVENTION

Figure 1:
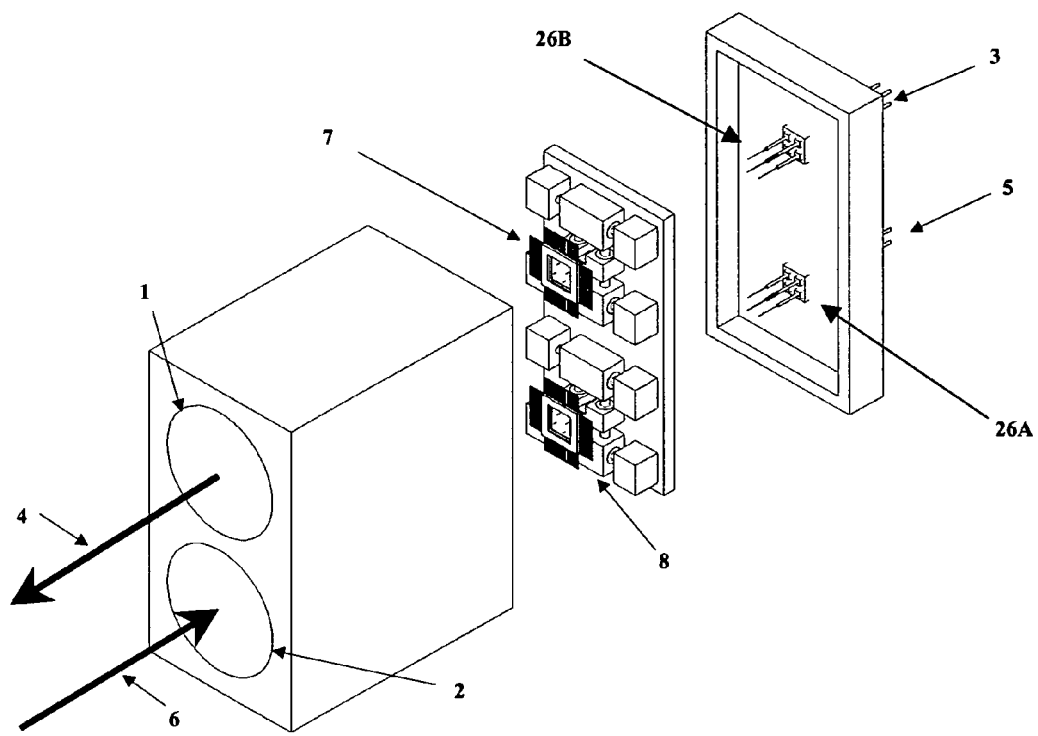
FIG. 1 is an exploded perspective view of a preferred embodiment of the present invention as employed in a Free Space Optical Transceiver Assembly (FSOTA).

With reference to FIG. 1, the preferred embodiment of the present invention may be described. The preferred embodiment is a Free Space Optical Transceiver Assembly (FSOTA), but the invention is not so limited, and in fact may be put to many other applications as will be apparent to those skilled in the art. The FSOTA of the preferred embodiment includes a transmitter telescope 1 and a receiver telescope 2. In alternative embodiments, the present invention could be applied to a transmitter-only or receiver-only arrangement, or alternatively to a system with a transceiver arrangement, that is, a single telescope used for both transmitting and receiving a signal, as are known in the art. The preferred embodiment further includes fiber optic and MEMS device power connectors 3 and 5, for the transmitter and receiver sections, respectively. The preferred embodiment is operable to generate and send optical energy into transmitter telescope 1 for transmission into free space at transmitted beam 4, and is operable to receive optical energy at receiver telescope 2 in the form of received beam 6. In communication with transmitter telescope 1 and receiver telescope 2 are transmitter MEMS beam steering module 7 and receiver MEMS beam steering module 8, respectively. Module 7 is operable to translate an optical fiber passing through connector 3 in the X-Y plane, and module 8 is operable to translate an optical fiber passing through connector 5 in the X-Y plane, as will be described hereafter. The FSOTA, in the preferred embodiment, contains the various transmit, receive, acquisition, and tracking control electronics (not shown) necessary for operation of the transceiver, which preferably are contained in a remote electronics bay. These electronic components provide control of the required azimuth and elevation range of motion and tracking slew rate for the MEMS translation devices to track and point the incoming and outgoing optical beams.

The preferred embodiment utilizes separated telescopes for optical noise isolation; modules 7 and 8 may, however, be utilized in other transceiver systems that require pointing and tracking. The optical receive and transmit signals are carried to the FSOTA on optical fibers 26A and 26B, respectively. As with most free space optical transceiver systems, the receiver telescope of the preferred embodiment is equipped with optical filters in order to filter out optical noise. In addition, the FSOTA includes an optical lens design that focuses the optical energy into the focal plane of receiver telescope 2. Receiver optical fiber 26A is automatically located at the focal spot in order to collect the incoming optical signal 6. It may be noted that any selected communications band in any of the optical domains may be utilized; however, in the preferred embodiment optical filtering is utilized, providing narrow-band optical intensity, and thereby providing low noise signal detection. The system may also utilize a direction of arrival detection system, which in the preferred embodiment uses a charge-coupled-device (CCD) array that allows for the location of the angle of arrival.

Figure 2:
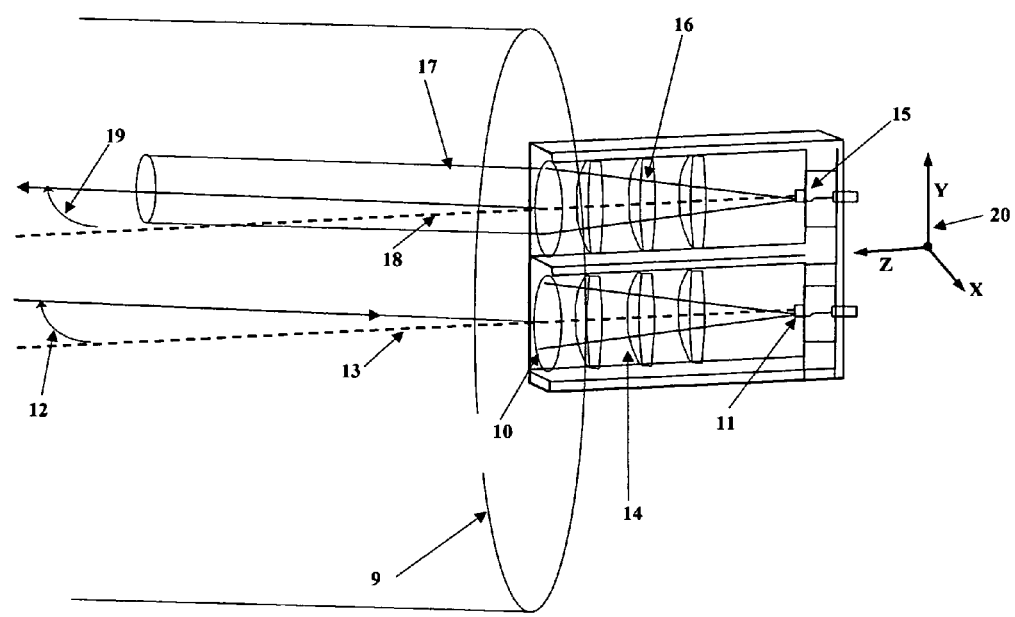
FIG. 2 is a diagram illustrating the operation of the FSOTA for an incoming beam angle of $\Delta\phi_{RX_1}$ and outgoing optical beam at an angle of $\Delta\phi_{TX_1}$ defined as the respective angles away from the optical Z-axes of the transmitter and receiver telescopes according to a preferred embodiment of the present invention.

FIG. 2 illustrates a preferred embodiment with the incoming received beam 9 and outgoing transmitted beam 17 in a first example configuration. The configuration shows the angular direction of the beams 9 and 17 with respect to the relative position of the FSOTA. Received signal 9 arrives from a remote transmitter. Received signal 9 arrives in an expanded form, such that only a portion of received signal 9 is actually captured by receiver telescope aperture 10 and focused onto receiver focal plane 11 through receiver lens system 14. The received beam angle of arrival 12 determines the location of the focused spot at receiver focal plane 11, as shown. Angle 12, which may also be designated as $\Delta\phi_{RX1}$ for purposes herein, may be defined as the angle that received signal 9 makes with respect to receiver telescope Z-Axis 13. Coordinate axis 20 of FIG. 2 may be used as a reference for coordinates as referred to herein.

As already described, received beam angle of arrival 12 determines the location on receiver focal plane 11 at which the optical energy will be focused. Receiver optical fiber 26A (shown in FIG. 1) is then moved such that its end is aligned with that location on receiver focal plane 11 at which the optical energy is focused, for purposes herein designated to be at X-Y coordinates $X_{RX1}$ and $Y_{RX1}$. Receiver optical fiber 26A thus can receive the light energy being directed upon focal plane 11 at X-Y coordinates $X_{RX1}$ and $Y_{RX1}$. Transmitter optical fiber 26B is simultaneously moved to that corresponding location on transmitter focal plane 15 defined as X-Y coordinates $X_{TX1}$ and $Y_{TX1}$. Light from optical fiber 26B passes through transmitter lens system 16, which expands and collimates transmitted beam 17 in order to produce diffraction limited beam propagation with minimal wave front distortion in the resulting transmitted beam 17. As may be seen, this re-location of optical fiber 26B results in transmitted beam angle 19 (also referred to herein as $\Delta\phi_{TX1}$) between transmitted signal 17 and transmitter telescope Z-axis 18. Thus transmitter telescope 1 is automatically adjusted to emit a transmitted signal 17 that is directed toward the source of received signal 9. It may be seen that in the preferred embodiment, received beam angle 12 and transmitted beam angle 19 (that is, angles $\Delta\phi_{RX1}$ and $\Delta\phi_{TX1}$, respectively) are equal.

Figure 3:
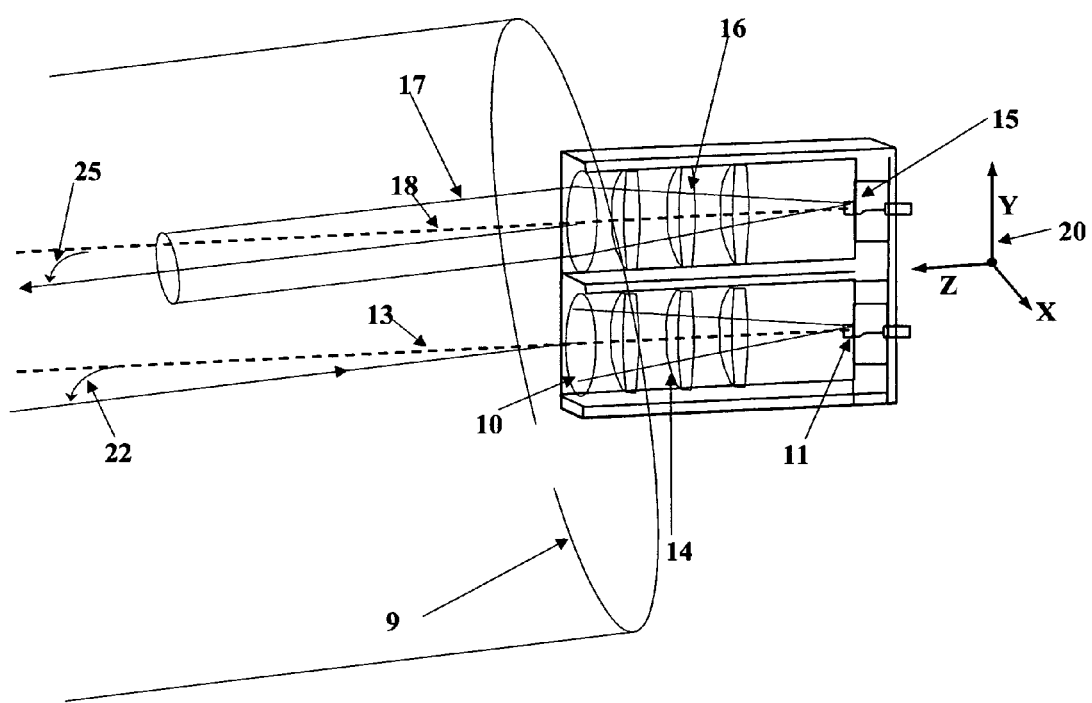
FIG. 3 is a diagram illustrating the operation of the FSOTA for an incoming beam angle of $\Delta\phi_{RX_2}$ and outgoing optical beam at an angle of $\Delta\phi_{TX_2}$ defined as the respective angles away from the optical Z-axes of the transmitter and receiver telescopes according to a preferred embodiment of the present invention.

FIG. 3 illustrates a second configuration for the preferred embodiment of the present invention, with different beam angles possibly representing either a different remote transceiver terminal or a new relative location of a remove transceiver with respect to the FSOTA position. Because of the change in location, modules 7 and 8 will move optical fibers 26A and 26B to this corresponding new location in the focal planes of the respective telescopes. (The means by which modules 7 and 8 perform this operation will be discussed below.)

As in the first configuration, the second configuration accepts received signal 9 arriving from a remote transmitter and focuses received signal 9 onto receiver focal plane 11 through receiver lens system 14. The received beam second angle of arrival 22 determines the location of the focused spot at receiver focal plane 11, as shown. Received beam second angle 22, which may also be designated as $\Delta\phi_{RX2}$ for purposes herein, may be defined as the angle that received signal 9 makes with respect to receiver telescope Z-Axis 13. Receiver optical fiber 26A (shown in FIG. 1) is then moved such that its end is aligned with that location on receiver focal plane 11 at which the optical energy is focused, for purposes herein designated to be at X-Y coordinates $X_{RX2}$ and $Y_{RX2}$. Transmitter optical fiber 26B is simultaneously moved to that corresponding location on transmitter focal plane 15 defined as X-Y coordinates $X_{TX2}$ and $Y_{TX2}$. Light from optical fiber 26B passes through transmitter lens system 16, which expands and collimates the optical signal to produce transmitted signal 17. As may be seen, this re-location of optical fiber 26B results in transmitted beam second angle 25 (also referred to herein as $\Delta\phi_{TX2}$) between transmitted signal 17 and transmitter telescope Z-axis 18. Thus transmitter telescope 1 is automatically adjusted to emit a transmitted signal 17 that is directed toward the source of received signal 9. It may be seen that in the preferred embodiment, received beam second angle 22 and transmitted beam second angle 25 (that is, angles $\Delta\phi_{RX2}$ and $\Delta\phi_{TX2}$, respectively) are equal.

FIGS. 4A, 4B, 5A, 5B, 6A, and 6B illustrate the operation of the MEMS modules 7 and 8 to the preferred embodiment of the present invention, by showing the relative location and movement of optical fiber 26. Each of the depictions represents either a receiving optical fiber 26A or a transmitting optical fiber 26B, both of which may be referred to generically herein as optical fiber 26. Optical fiber 26 is fed into open fiber feed-through tube 27 through fiber support block 28. The open tube is enclosed with the interface block 29 and the MEMS substrate 30. The output portion of optical fiber 26 is supported by the MEMS system optical fiber support 31, with the face of the fiber exposed for transmission and/or reception of the optical beam 32 into or out of the appropriate telescope. Optical beam 32 will diverge upon leaving the end of optical fiber 26, forming signal cone 34. The MEMS translation actuation devices (arms) 33 move the fiber in the X-Y plane by extending or retracting, that is, moving either toward or away from, respectively, the center of open fiber feed-through tube 27, as illustrated in each of the cases depicted in FIGS. 4B, 5B, and 6B, thereby moving the position of fiber optic 26 and the resulting direction of signal cone 34. Arms 33 are connected to optical fiber support 31 by means of linkages 50. Although an infinite number of possible optical fiber 26 positions exist in order to properly align the optical beam 32 of optical fiber 26, three positions will be shown and described for purposes of illustration.

Figure 4A:
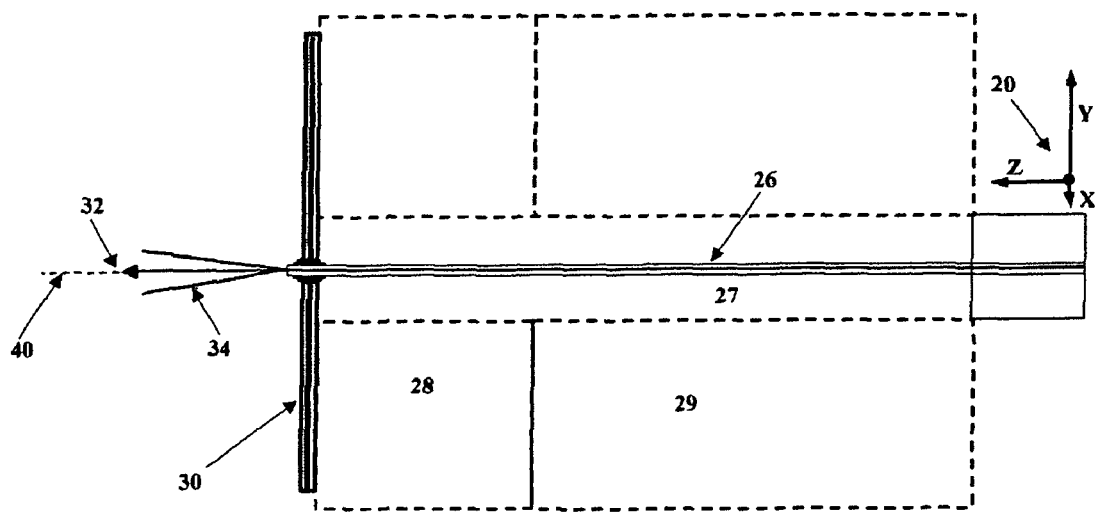
FIG. 4A is a side elevational view illustrating the translation of an optical fiber in the X-Y plane at a position that provides an input (or output) angle along the Z-Axis of the telescope, represented by the X-Y position of $(X_0, Y_0)=(0,0)$ with a fiber output beam angle of $\Delta\phi=0$ according to a preferred embodiment of the present invention.
Figure 4B:
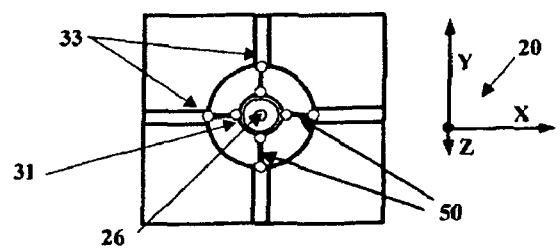
FIG. 4B is an end elevational view illustrating the translation of an optical fiber in the X-Y plane at a position that provides an input (or output) angle along the Z-Axis of the telescope, represented by the X-Y position of $(X_0, Y_0)=(0,0)$ with a fiber output beam angle of $\Delta\phi=0$ according to a preferred embodiment of the present invention.

FIGS. 4A and 4B illustrate Fiber Position 0, representing a position where optical fiber 26 lies along the instrument Z-axis 40, and thus having a position defined as X=0 and Y=0 in the X-Y plane. The input/output angle $\Delta\phi$, defined as the angle formed between instrument Z-axis 40 and the direction of radiation emitted from optical fiber 26, is zero in Fiber Position 0. As may be seen from FIG. 4B, MEMS translation devices 33 are extended at equal lengths towards optical fiber 26.

Figure 5A:
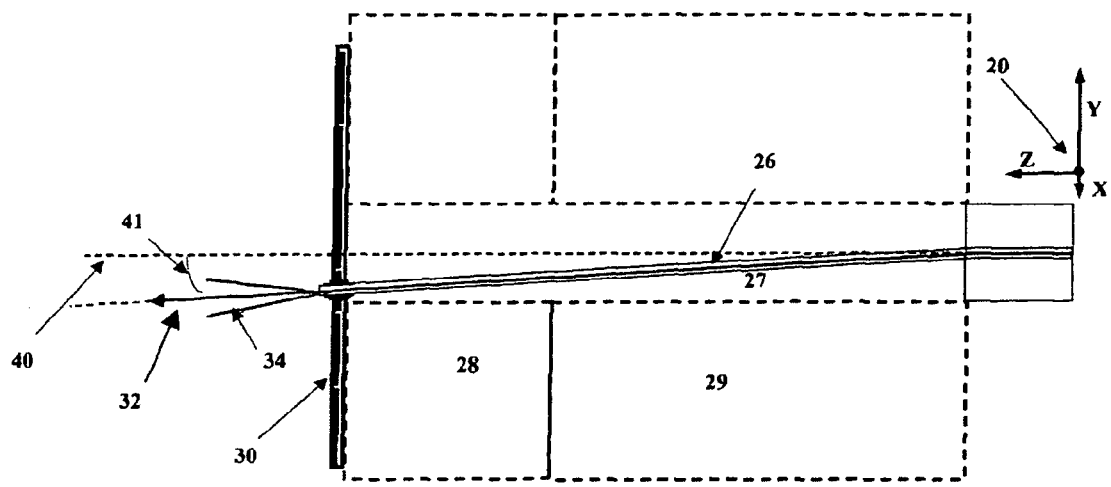
FIG. 5A is a side elevational view illustrating the translation of an optical fiber in the X-Y plane at an optical fiber position that provides an input (or output) angle from the optical fiber of either $\Delta\phi_{1A}$ and $\Delta\phi_{1B}$ created by the location of the optical fiber's output in the focal plane of $(X_{1A}, Y_{1A})$ and $(X_{1B}, Y_{1B})$, respectively, according to a preferred embodiment of the present invention.
Figure 5B:
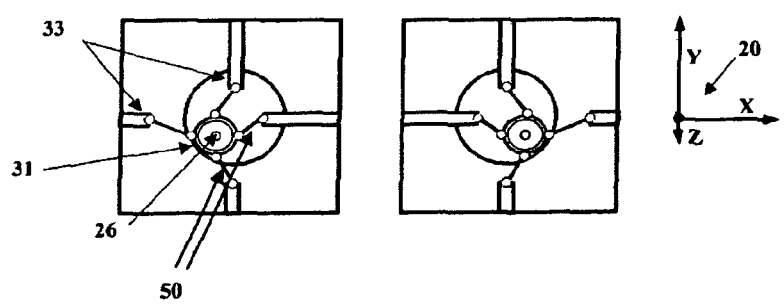
FIG. 5B is a side elevational view illustrating the translation of an optical fiber in the X-Y plane at an optical fiber position that provides an input (or output) angle from the optical fiber of either $\Delta\phi_{1A}$ and $\Delta\phi_{1B}$ created by the location of the optical fiber's output in the focal plane of $(X_{1A}, Y_{1A})$ and $(X_{1B}, Y_{1B})$, respectively, according to a preferred embodiment of the present invention.

FIGS. 5A and 5B illustrate Fiber Position 1. As shown in FIG. 5A, optical fiber 26 is now below instrument Z-axis 40. FIG. 5B shows two possible sub-configurations corresponding to Fiber Position 1, designated as Fiber Position 1A and Fiber Position 1B. In Fiber Position 1A, shown in the left portion of FIG. 5B, optical fiber 26 has moved to the lower left as viewed from the front of the device, with coordinates designated as $X_{1A}$ and $Y_{1A}$, for an input/output beam angle 41 from optical fiber 26, designated as $\Delta\phi_{1A}$. In Fiber Position 1B, shown in the right portion of FIG. 5B, optical fiber 26 has moved to the lower right as viewed from the device, with coordinates designated as $X_{1B}$ and $Y_{1B}$, for an input/output beam angle 41 from optical fiber 26, designated as $\Delta\phi_{1B}$.

Figure 6A:
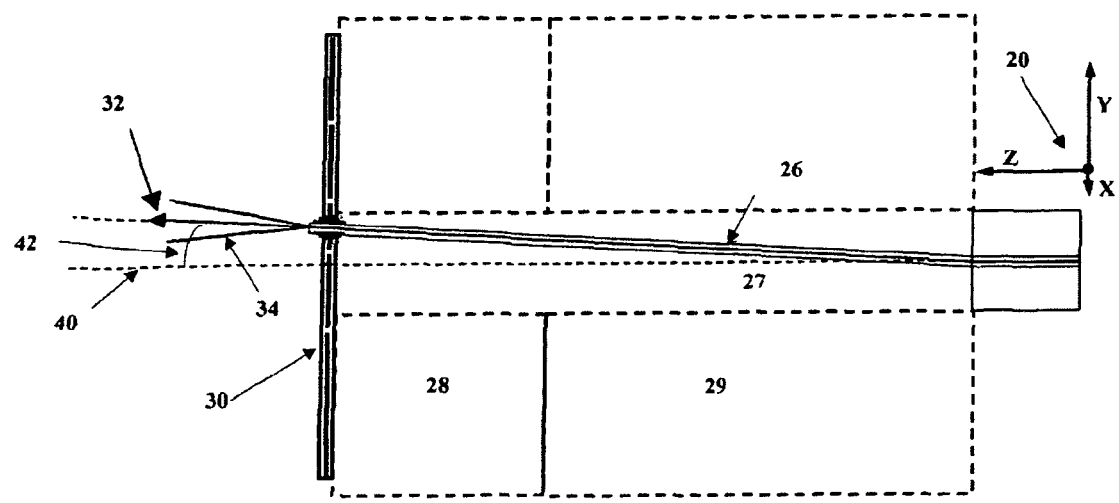
FIG. 6A is a side elevational view illustrating the translation of an optical fiber in the X-Y plane at an optical fiber position that provides an input (or output) angle from the optical fiber of either $\Delta\phi_{2A}$ and $\Delta\phi_{2B}$ created by the location of the optical fiber's output in the focal plane of $(X_{2A}, Y_{2A})$ and $(X_{2B}, Y_{2B})$, respectively, according to a preferred embodiment of the present invention.
Figure 6B:
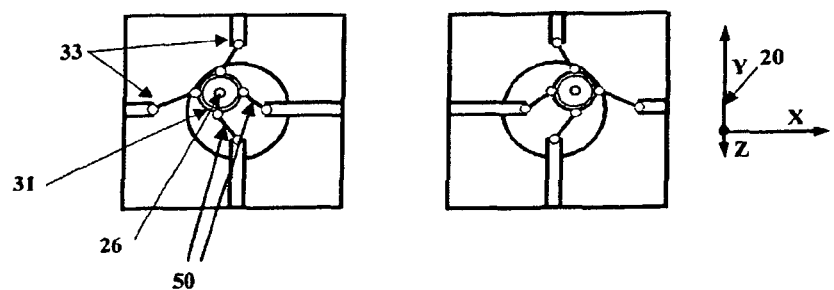
FIG. 6B is a side elevational view illustrating the translation of an optical fiber in the X-Y plane at an optical fiber position that provides an input (or output) angle from the optical fiber of either $\Delta\phi_{2A}$ and $\Delta\phi_{2B}$ created by the location of the optical fiber's output in the focal plane of $(X_{2A}, Y_{2A})$ and $(X_{2B}, Y_{2B})$, respectively, according to a preferred embodiment of the present invention.

FIGS. 6A and 6B illustrate Fiber Position 2. As shown in FIG. 6A, optical fiber 26 is now above instrument Z-axis 40. FIG. 6B shows two possible sub-configurations corresponding to Fiber Position 2, designated as Fiber Position 2A and Fiber Position 2B. In Fiber Position 2A, shown in the left portion of FIG. 6B, optical fiber 26 has moved to the upper left as viewed from the front of the device, with coordinates $X_{2A}$ and $Y_{2A}$, for an input/output beam angle 42 from optical fiber 26, designated as $\Delta\phi_{2A}$. In Fiber Position 2B, shown in the right portion of FIG. 6B, optical fiber 26 has moved to the upper right as viewed from the device, with coordinates designated as $X_{2B}$ and $Y_{2B}$, for an input/output beam angle 42 from optical fiber 26, designated as $\Delta\phi_{2B}$.

Figure 7:
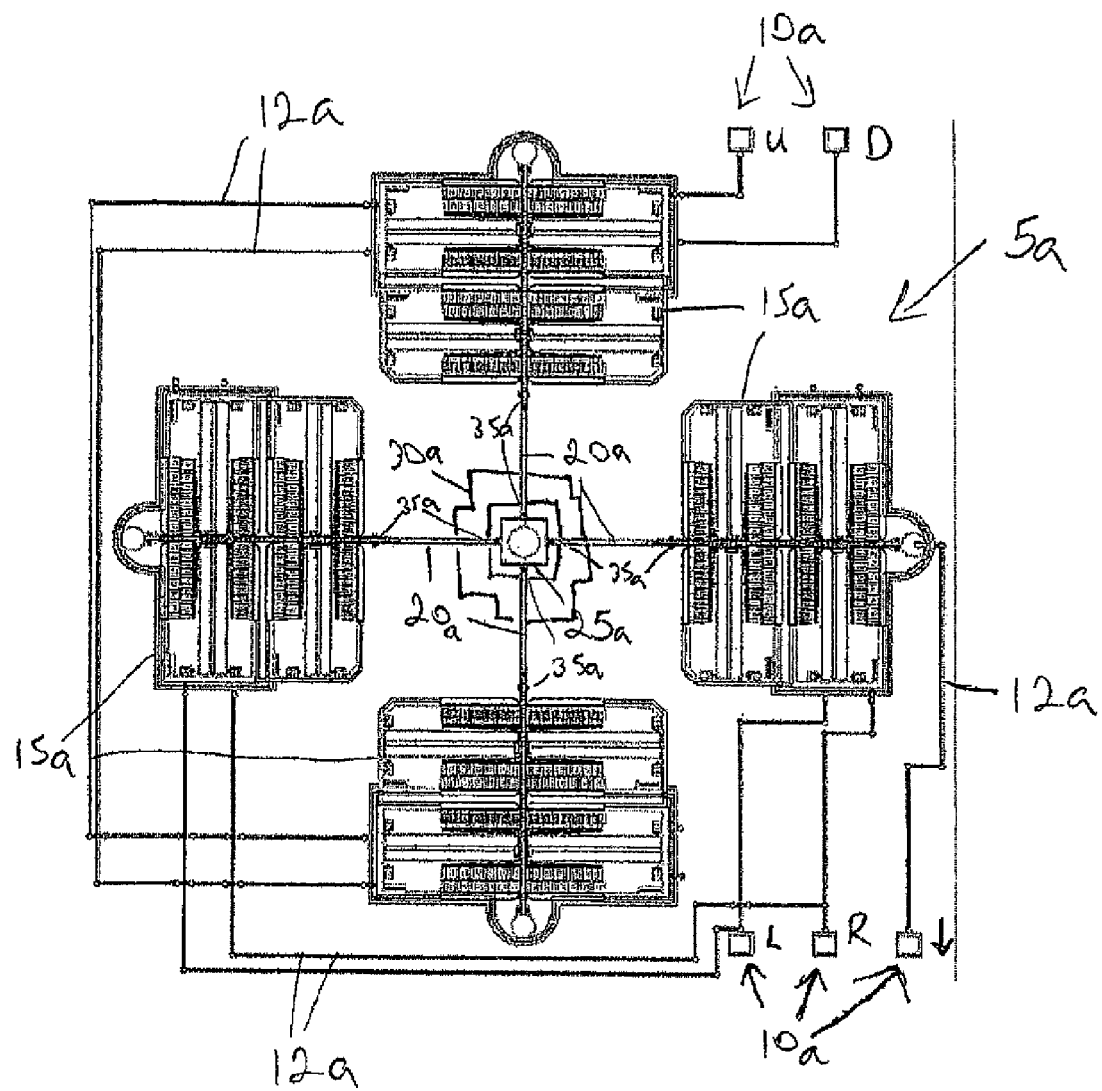
FIG. 7 is an end elevation view illustrating the relationship between the actuators and the arms.

MEMS translation devices 33 preferably provide a tracking bandwidth of up to 10,000 Hz, for closed loop control. The design and construction of MEMS translation devices 33 is set forth in U.S. Pat. No. 7,224,508, entitled "MEMS-Based Optical Communications Beam Steering Apparatus," the entire disclosure of which is incorporated herein by reference. Specifically, and as illustrated in FIG. 7, actuators 15a drive arms 20a, which are pivotally linked to both a corresponding actuator 15a and fiber yoke 25a. Arms 20a move about on top of ground plane substrate 30a. which is preferably constructed of polysilicon. Arms 20a have pin or flex joints 35a at each end to allow yoke 25a to move freely in the X-Y plane above ground plane substrate 30a, including movement at non-orthogonal angles. Electrical drive signals reach each of actuators 15a through the corresponding bond pads 10a and the corresponding conducting paths 12a. Four different types of signals are employed in the preferred embodiment: up, down, left, and right. These signals are labeled "U," "D," "L," "R," respectively, in FIG. 7. A ground signal is also required, which is labeled as a down arrow in FIG. 7. (Note that while only a single ground signal is illustrated in FIG. 7 for clarity, the preferred embodiment would include a ground line connected to each of actuators 15a.) Each of the "U" "D," "L," and "R" signals may preferably be coded as a voltage applied at the corresponding bond pad 10a. A "U" signal causes the activation of the appropriate actuator 15a such that the arm 20a oriented in the Y-direction moves in the positive Y-direction, that is, in an upward direction, thereby causing yoke 25a to deflect upward. A "D" signal causes the activation of that same actuator 15a as activated by the "U" signal, but in this case the corresponding arm 20a moves in the negative Y-direction, that is, in a downward direction, thereby causing yoke 25a to deflect downward. An "L" signal causes the activation of each of the appropriate actuators 15a such that the arms 20a that are oriented in the X-direction move in the negative X-direction, that is, to the left, thereby causing yoke 25a to deflect to the left. It may be noted that this movement requires the leftward arm 20a to retract while the rightward arm 20a extends. Conversely, a "R" signal causes the activation of each of these actuators 15a such that the arms 20a that are oriented in the X-direction move in the positive X-direction, that is, to the right, thereby causing yoke 25a to deflect to the right. It may be noted that this movement requires the leftward arm 20a to extend while the rightward arm 20a retracts. A control system may be implemented to manipulate MEMS translation devices 33 in accordance with the preferred embodiment of the present invention. The operation of the control loop is preferably based upon a maximization of the optical power collected by the receiver version of optical fiber 26A, and manipulation of the transmitter version of optical fiber 26B in accordance with its position. Various such algorithms are known in the art. In the preferred embodiment, such a control system may be implemented in software using a microprocessor in communication with the LTTA.

The present invention has been described with reference to certain preferred and alternative embodiments that are intended to be exemplary only and not limiting to the full scope of the present invention as set forth in the appended claims.

What is claimed is:

1. An optical communications apparatus defining a Z-axis and an X-Y plane, comprising:
   (a) an optical fiber comprising a first end and a second end, wherein said optical fiber lies generally along the Z-axis of the apparatus when said optical fiber is in an untranslated state;
   (b) at least one of a first optical signal receiver and a first optical signal transmitter in communication with said first end of said optical fiber; and
   (c) a plurality of actuators attached to said optical fiber, wherein each of said actuators comprises an arm of constant length and a MEMS device in communication with said arm and lying along the X-Y plane of the apparatus, and wherein at least one of said plurality of actuators comprises an X-direction translational component and at least one of said plurality of actuators comprises a Y-direction translational component, and said X-direction translational component is attached to said optical fiber but not attached to said Y-direction translational component, and said Y-direction translational component is attached to said optical fiber but not attached to said X-direction translational component; and
   (d) at least one of a second optical signal receiver and a second optical signal transmitter positioned remotely from said optical fiber along a line extending longitudinally from said second end of said optical fiber.

2. The apparatus of claim 1, wherein each of said plurality of actuators comprises a joint pivotally connecting said arm to said optical fiber.

3. The apparatus of claim 2, wherein each of said actuator arms are at least one of retractable and extendable to translate said second end of said optical fiber within the X-Y plane of the apparatus.

4. The apparatus of claim 3, further comprising an optical fiber support attaching said optical fiber to said plurality of actuator joints.

5. The apparatus of claim 2, further comprising an optical telescope opposite the second end of said optical fiber.

6. A method of communicating using optical signals, comprising:
   (a) detecting an incoming optical signal from a remote optical transmitter;
   (b) translating a receiver optical fiber comprising a first end and a second end such that the second end of the receiver optical fiber is pointed toward a perceived maximum intensity area of the incoming optical signal, wherein said translating step is performed by means of a plurality of actuators attached to the receiver optical fiber, wherein each of said actuators comprise an arm of constant length and a MEMS device in communication with said arm, and wherein at least one of said plurality of actuators comprises an X-direction translational component and at least one of said plurality of actuators comprises a Y-direction translational component, and said X-direction translational component attaches to and translates said optical fiber in the X-direction without direct lateral translation of said Y-direction translational component in the X-direction, and said Y-direction translational component attaches to and translates said optical fiber in the Y-direction without direct lateral translation of said X-direction translational component in the Y-direction;
(c) receiving at the second end of the receiver optical fiber the incoming optical signal, and passing the incoming optical signal to the first end of the receiver optical fiber;
(d) converting the incoming optical signal to an electrical signal;
(e) formulating an electrical response signal to the incoming optical signal;
(f) converting the electrical response signal to an outgoing optical signal;
(g) determining a direction for the transmission of the outgoing optical signal based on the direction from which the incoming optical signal was received;
(h) translating a transmitter optical fiber comprising a first end and a second end such that the second end of the transmitter optical fiber is pointed in the optimum direction for the transmission of the outgoing optical signal, wherein said translating step is performed by means of an actuator attached to the transmitter optical fiber; and
(i) receiving at the first end of the transmitter optical fiber the outgoing optical signal, and passing the outgoing optical signal to the second end of the transmitter optical fiber.

7. The method of claim 6, wherein said step of determining a direction for the transmission of the outgoing optical signal based on the direction from which the incoming optical signal was received comprises the determination of that direction that is opposite of the direction from which the incoming optical signal was received.

8. The method of claim 7, wherein each of the plurality of actuators comprises a joint in communication with the arm and a respective one of the receiver optical fiber and the transmitter optical fiber, and wherein said translating steps are performed by means of at least one of retracting and extending at least one of the actuator arms and causing a corresponding translational movement of the fiber.

9. The method of claim 8, wherein said translating steps comprise the step of sending an electrical signal to at least one of said actuators.

10. An optical communications subsystem, comprising:
(a) an optical fiber lying along a Z-axis of the subsystem when said optical fiber is in an untranslated state; and
(b) a MEMS device lying along an X-Y plane of the subsystem and attached to said optical fiber, wherein said MEMS device comprises a plurality of actuators each comprising an arm of constant length linked to said fiber wherein each of said actuators is attached to said optical fiber and operable to manipulate said optical fiber in at least two dimensions by movement of said MEMS device within the X-Y plane of the subsystem, and wherein at least one of said plurality of actuators comprises an X-direction translational component and at least one of said plurality of actuators comprises a Y-direction translational component, and said X-direction translational component is operable to translate said optical fiber in the X-direction without translation of said Y-direction translational component in the X-direction, and said Y-direction translational component is operable to translate said optical fiber in the Y-direction without translation of said X-direction translational component in the Y-direction; and
(c) at least one of a remote optical signal receiver and a remote optical signal transmitter positioned remotely from said optical fiber.

11. The apparatus of claim 10, further comprising an optical fiber support connecting said optic fiber to said plurality of actuator arms.

12. The apparatus of claim 10, further comprising a focal plane adjacent to an end of said optical fiber.

13. apparatus of claim 12, further comprising a telescope in communication with said focal plane, wherein an optical signal may be one of received and transmitted between said focal plane and said telescope.

* * * * *

UNITED STATES PATENT AND TRADEMARK OFFICE
CERTIFICATE OF CORRECTION

| | | |
|---|---|---|
| PATENT NO. | : 7,612,329 B2 | Page 1 of 1 |
| APPLICATION NO. | : 11/224745 | |
| DATED | : November 3, 2009 | |
| INVENTOR(S) | : Charles H. Chalfant, III et al. | |

It is certified that error appears in the above-identified patent and that said Letters Patent is hereby corrected as shown below:

Specification

In Column 1, lines 20-24, delete "The U.S. Government has a paid-up license in this invention and the right in limited circumstances to require the patent owner to license others on reasonable terms as provided for by the terms of contract no. F29601-02-C-0021 awarded to the United States Air Force Research Laboratory." and insert --This invention was made with Government support under contract F29601-02-C-0021 and FA9453-12-M-0354 awarded by the United States Air Force. The Government has certain rights in this invention.--, therefor.

Signed and Sealed this
Twenty-seventh Day of October, 2015

Michelle K. Lee
*Director of the United States Patent and Trademark Office*